United States Patent
Mayer

(10) Patent No.: US 9,981,593 B2
(45) Date of Patent: May 29, 2018

(54) DYNAMIC MEANS OF ILLUMINATING A FIELD OF VISION

(71) Applicant: ZIZALA LICHTSYSTEME GMBH, Wieselburg (AT)

(72) Inventor: Peter Mayer, Wieselburg (AT)

(73) Assignee: ZKW GROUP GMBH, Wieselburg an der Erlauf (AT)

(*) Notice: Subject to any disclaimer, the term of this patent is extended or adjusted under 35 U.S.C. 154(b) by 206 days.

(21) Appl. No.: 14/904,965

(22) PCT Filed: Jul. 15, 2014

(86) PCT No.: PCT/AT2014/050157
§ 371 (c)(1),
(2) Date: Jan. 14, 2016

(87) PCT Pub. No.: WO2015/006793
PCT Pub. Date: Jan. 22, 2015

(65) Prior Publication Data
US 2016/0152173 A1 Jun. 2, 2016

(30) Foreign Application Priority Data

Jul. 16, 2013 (AT) .............................. A 50454/2013

(51) Int. Cl.
*B60Q 1/02* (2006.01)
*B60Q 1/08* (2006.01)
(Continued)

(52) U.S. Cl.
CPC ........... *B60Q 1/085* (2013.01); *B60Q 1/1438* (2013.01); *B60Q 1/16* (2013.01);
(Continued)

(58) Field of Classification Search
CPC ........ B60Q 1/085; B60Q 1/1438; B60Q 1/16; B60Q 2300/054; B60Q 2300/23; B60Q 2300/322; B60Q 2300/45
See application file for complete search history.

(56) References Cited

U.S. PATENT DOCUMENTS 6,281,632 B1 * 8/2001 Stam ..................... B60Q 1/085
250/208.1
9,707,885 B2 * 7/2017 Langkabel ........... B60Q 1/1423
(Continued)

FOREIGN PATENT DOCUMENTS

DE 102005036002 A1 2/2007
DE 102007060399 A1 6/2009
(Continued)

OTHER PUBLICATIONS

International Search Report for PCT/AT2014/050157 dated Apr. 11, 2014.
(Continued)

*Primary Examiner* — Peggy Neils
(74) *Attorney, Agent, or Firm* — Eversheds Sutherland (US) LLP

(57) ABSTRACT

A process for producing an adaptive light pattern that is produced by at least one vehicle headlight (SW1, SW2) in a vehicle (2) that can be steered by a vehicle driver (3), the at least one vehicle headlight (SW1, SW2) having at least one adaptive means of illumination (BM1, BM2), wherein at least one camera (5) detects the direction (BR) in which the vehicle driver is looking, at least one computing unit (6) evaluates the information obtained in this way and produces, on the basis of this information, control signals and transmits the control signals to the at least one vehicle headlight (SW1, SW2) with the at least one adaptive means of illumination (BM1, BM2), and wherein the at least one adaptive means of illumination (BM1, BM2) is controlled, on the basis of the control signals for targeted illumination of an area (BR1) lying in the direction (BR) in which the vehicle driver (3) is looking.

18 Claims, 2 Drawing Sheets

(51) Int. Cl.
*B60Q 1/14* (2006.01)
*B60Q 1/16* (2006.01)

(52) U.S. Cl.
CPC .... *B60Q 2300/054* (2013.01); *B60Q 2300/23* (2013.01); *B60Q 2300/322* (2013.01); *B60Q 2300/45* (2013.01)

(56) References Cited

U.S. PATENT DOCUMENTS

2009/0016073 A1   1/2009  Higgins-Luthman et al.
2012/0206050 A1*  8/2012  Spero ................ B60Q 1/04
                                              315/152

FOREIGN PATENT DOCUMENTS

| DE | 102009048619 A1 | 6/2010 |
| EP | 1506893 A2 | 2/2005 |
| EP | 2384932 A2 | 11/2011 |
| EP | 2700536 A2 | 2/2014 |
| JP | 2006021631 A | 1/2006 |
| WO | 2007014625 A1 | 2/2007 |

OTHER PUBLICATIONS

Search Report for Austrian Patent Application No. A 50454/2013 dated Jul. 5, 2014.

\* cited by examiner

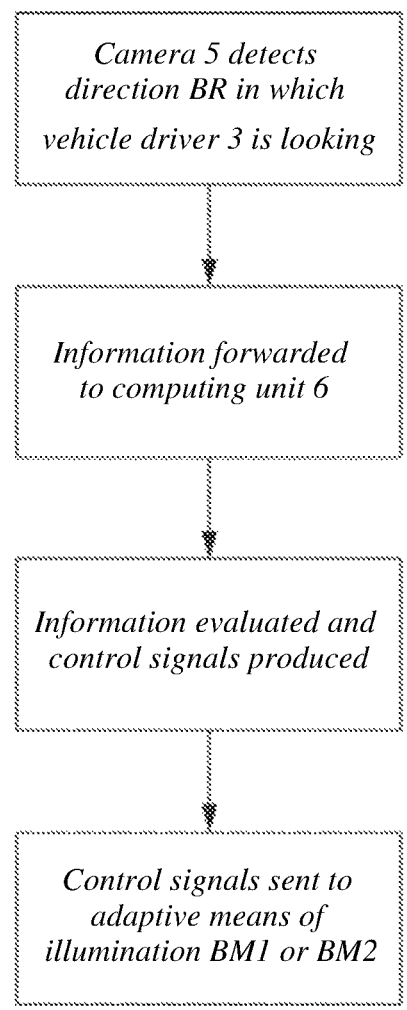

DYNAMIC MEANS OF ILLUMINATING A FIELD OF VISION

The invention relates to a process for producing an adaptive light pattern that is produced by at least one vehicle headlight in a vehicle that can be steered by a vehicle driver, the at least one vehicle headlight having at least one adaptive means of illumination.

In addition, the invention relates to an illumination system and a motor vehicle with this illumination system for producing an adaptive light pattern that is produced by at least one vehicle headlight in a vehicle steered by a vehicle driver, the at least one vehicle headlight having at least one adaptive means of illumination.

Motor vehicles with adaptive means of illumination to produce an adaptive light pattern have already been disclosed in the prior art. For example, the document EP 1 506 893 A2 shows a motor vehicle in which a controllable lighting device interacts with a device for detecting the surrounding in such a way that objects located in the surroundings can be individually illuminated. Here the term "surroundings" relates to the surroundings of the vehicle. Stationary or movable objects such as, for example, road marking elements, pedestrians, bicyclists, or animals can be detected and individually illuminated. This device for detecting the surroundings acts independently of the vehicle driver. Thus, it is possible for a vehicle driver to suspect that there is an object in an unlighted area, however the controllable illumination device is illuminating another object, so that the vehicle driver remains uncertain about his suspicion. In such a situation, the vehicle driver will frequently continue to look in the same direction, attempting to recognize the suspected object or to be able to exclude its presence. In such a situation, the attention of the vehicle driver is occupied, which means, on the one hand, that the danger of a collision with the unilluminated object (for example, an animal hidden in the shrubbery) cannot be excluded, and, on the other hand, that the danger of a collision with other objects is greatly increased.

Therefore, it is a goal of the invention to create a process for producing an adaptive light pattern in which information about the vehicle driver is detected and taken into consideration in the selection of areas to be illuminated. In a first aspect of the invention, this goal is achieved with a process of the type mentioned at the beginning, wherein according to the invention at least one camera detects the direction in which the vehicle driver is looking, at least one computing unit evaluates the information obtained in this way and produces, on the basis of this information, control signals and transmits the control signals to the at least one vehicle headlight with the at least one adaptive means of illumination, and wherein which the at least one adaptive means of illumination is controlled, on the basis of the control signals for targeted illumination of an area lying in the direction in which the vehicle driver is looking. The information about the direction in which the driver is looking is preferably independently sent from the camera to the computing unit. Alternatively, the computing unit could also retrieve this information independently. The inventive process makes it possible to detect information about the vehicle driver, evaluate it, and use it to influence the targeted illumination of objects and/or areas in a meaningful way. This can decisively improve the vehicle driver's perception and thus increase traffic safety.

The camera provided can be any monitoring device that is suitable for detecting optical signals. For example, driver drowsiness detection systems known from the prior art can be modified for this purpose; such systems are equipped with at least one camera, and recognize symptoms of tiredness using optical monitoring of the vehicle driver, in particular the driver's eyes. Thus, the inventive process is feasible with especially small expense, and can be implemented with existing hardware, and is simple to combine with other vehicle assistance systems. It is also possible to provide two or more cameras that jointly detect the direction in which the driver is looking. In the context of this patent specification, the term "control" can be understood to mean both open-loop and also closed-loop control behavior. Therefore, the term "control" is not to be interpreted in a restrictive sense (as it is in automatic control science and technology). In the same way, the expression "information" is not to be interpreted in a restrictive way, and can also comprise multiple pieces of information. Moreover, the information about the direction in which the driver is looking can be evaluated and used for other purposes. For example, eye-controlled operation of controls located in the vehicle, such as, for example, the controls of a radio, navigation system, air conditioner, etc., can be realized in the same way. The "adaptive light pattern" produced by the inventive process produces dynamic illumination of the field of view, which can dynamically follow the direction in which the vehicle driver is looking.

An advantageous embodiment of the inventive process provides that the adaptive light pattern is produced by horizontal and/or vertical segmentation of the light pattern of the at least one means of illumination. This segmentation can be done, for example in laser headlights, by the orientation of a mirror reflecting and directing a light beam, or in matrix or pixel headlights, by activating individual light sources, associated with individual segments of the light pattern.

In accordance with a further development of the inventive process, the adaptive light pattern is put together from the light patterns of two vehicle headlights each of which has at least one adaptive means of illumination. The vehicle headlights can be the front headlights, for example. It is especially advantageous if an adaptive means of illumination already present in the vehicle headlight is additionally triggered by the computing unit for targeted illumination of the area lying in the direction in which the vehicle driver is looking. For example, a single adaptive means of illumination provided in a vehicle headlight can be used to produce a conventional light pattern and an adaptive light pattern. Such a variant is especially cost-effective. The adaptive light pattern is produced by putting together, that is overlaying or superposing the light patterns, each of which is produced by a vehicle headlight. In an alternative variant, it is also possible for only one vehicle headlight to be equipped with an adaptive means of illumination.

To achieve an especially favorable embodiment of the adaptive light pattern, an especially efficient variant of the inventive process provides that the adaptive light pattern is put together from the light patterns of two vehicle headlights, each of which has precisely one adaptive means of illumination. For example, [producing] an adaptive light pattern by means of two front headlights, each of which has an adaptive means of illumination, is especially economical and efficient.

An especially targeted illumination of the area lying in the direction in which the vehicle driver is looking can be achieved by a further development of the inventive process in which the adaptive light pattern is produced by at least two adaptive means of illumination that are controlled independently of one another. For example, the individual adaptive means of illumination can be directed differently, for example to compensate for their differences in position, and to illuminate the desired area especially clearly. Especially sharply delimited illumination is most important when there is a danger of other road users being blinded by the adaptive light pattern. Another advantage of independent control of the two adaptive means of illumination is that even if one the adaptive means of illumination should fail, the remaining adaptive means of illumination can continue to produce an adaptive light pattern. This control can be realized either by a common computing unit or by [providing] two independent computing units, which increases the redundancy.

An advantageous embodiment of the inventive process can provide that the vehicle surroundings are detected by at least one camera, and that the at least one computing unit evaluates the information obtained in this way and recognizes road users located in the vehicle surroundings and selects them according to defined criteria, at least the targeted illumination of the selected road users being suppressed. It is preferable for the vehicle surroundings to be detected by an additional camera, which can be connected, for example, with an additional computing unit to evaluate the information about the vehicle surroundings. The road users located in the vehicle surroundings can be recognized with the help of known image processing algorithms. The selection of road users can involve, for example, recognizing oncoming road users and masking them out. Criteria that can be used for this purpose are, for example, movements of the recognized road users and/or the position of the road users (e.g., in a left area of the picture or the left half of the picture of the vehicle surroundings detected using a camera, relative to the direction of travel of the vehicle).

Here it is favorable if individual light functions can be executed according to a hierarchy. For example, it can be provided that the at least one adaptive means of illumination maps multiple functions (e.g., low beams, high beams, and adaptive light pattern). For example, it is possible to realize basic light patterns such as low beams and high beams and glare-free high beams, for example, by dimming individual segments of a light pattern. A cone of light produced by the at least one adaptive means of illumination and shining in the direction in which the vehicle driver is looking can preferably be realized by another function of a single light source. To prevent collisions of these different light functions, it is favorable for there to be a hierarchy (so-called prioritization) of the areas to be illuminated and masked. Here the highest priority can be given to the low-beam function. The second-highest priority can be given, e.g., to a glare-free high-beam-function in which the other road users can be masked in a targeted manner. Targeted illumination of an area lying in direction in which the vehicle driver is looking can be given lower priority than that of the glare-free high beams. This can avoid illuminating the area lying in the direction in which the vehicle driver is looking and blinding the oncoming traffic.

Therefore, it can be advantageous to give the highest priority to producing a low-beam pattern, followed by a high-beam pattern, and [then a pattern] controlled by the direction in which the driver is looking. In particular, it can be provided that the at least one camera detects a curve in the road lying in front of the vehicle and deactivates the targeted illumination of an area lying in the direction in which the vehicle driver is looking (called gaze-directed illumination for short) to prevent distraction of the vehicle driver and keep him focused on the curve. Such deactivation can be made dependent on the driving speed of the vehicle and/or the radius of the curve. In particular, such deactivation can be provided at speeds over 30 km/h (or 50 km/h or 100 km/h) and/or for radii of curvature less than 100 m. It would also be possible to use the quotient of the driving speed and the radius of curvature as an indicator for deactivation of the gaze-directed illumination. For example, the deactivation could occur at quotients greater than 3 (km/h)/m (corresponding to a driving speed of 30 km/h with a radius of curvature of 10 m). Another indicator that could be used for deactivation of the gaze-directed illumination is the transverse acceleration, which can be measured or calculated in a simple way, by dividing the square of the driving speed by the radius of the curve. Gaze-directed illumination could be deactivated at transverse accelerations of over 0.1 g, 0.2 g, or 0.5 g (where g represents the acceleration of gravity—about 9.81 m/s$^2$).

To prevent blinding of the vehicle driver, it can be provided that the vehicle surroundings are detected by at least one camera, and that the at least one computing unit evaluates the information obtained in this way and recognizes light-reflecting objects, in particular road signs, located in the vehicle surroundings and controls the intensity of targeted illumination of a light-reflecting object on the basis of its reflectivity. If the vehicle driver gazes at a light-reflecting object, then this object is illuminated by means of the gaze-directed illumination and the amount of light reflected back to the vehicle driver, the luminous flux, and/or the luminous intensity are measured. If the amount of light, the luminous flux, and/or the luminous intensity exceed a definable limit, then the intensity of the targeted illumination can be reduced.

It can be especially favorable if the vehicle surroundings are detected by at least one camera and the at least one computing unit evaluates the information obtained by means of the camera and checks objects, in particular moving objects, located in the vehicle surroundings for their relevance to the traffic on the basis of defined criteria, the position of a respective object being compared with the direction in which the vehicle driver is looking and, depending on the result of the checking of the object and the comparison with the direction in which the vehicle driver is looking, taking at least one illuminating engineering measure to direct the attention of the vehicle driver. Such an illuminating engineering measure can be a wiper/light function, for example, in which a cone of light is directed toward the respective object. This is preferably done by the adaptive means of illumination. Another illuminating engineering measure can be realized, e.g., by repeatedly turning on and off (e.g., pulsing) the cone of light directed onto the respective object.

A second aspect of the invention involves achieving the goal defined above with an illumination system to produce an adaptive light pattern of the type mentioned at the beginning, in which according to the invention at least one camera is set up to detect the direction in which the vehicle driver is looking, it being possible for the at least one adaptive means of illumination to be controlled by at least one computing unit for targeted illumination of an area lying in the direction in which the vehicle driver is looking. This involves the computing unit receiving the information about the direction in which the driver is looking from the at least one camera (as previously described). The inventive illumination system allows information about the vehicle driver (or an interaction with the vehicle driver) to be taken into consideration in a light pattern that can be specified by the at least one computing unit.

In an especially simple embodiment of the inventive illumination system, the at least one means of illumination has horizontal and/or vertical segmentation. This segmentation can be done, for example in laser headlights, by the orientation of a mirror reflecting and directing a light/laser beam, or in matrix or pixel headlights, by activating individual light sources, which thus produce individual segments of the light pattern. Therefore, it is simple to make use of existing headlight or illumination systems.

In an economical embodiment of the inventive illumination system, the vehicle, in particular the at least one vehicle headlight, has precisely one adaptive means of illumination. The vehicle headlights can be the front headlights, for example. It is especially advantageous if an adaptive means of illumination already present in the vehicle headlight is triggered by the computing unit for targeted illumination of the area lying in the direction in which the vehicle driver is looking. For example, a single adaptive means of illumination provided in a vehicle headlight can be used both to produce a conventional light pattern and also to produce an adaptive light pattern. Such a variant is especially cost-effective. Alternatively, in addition to the adaptive means of illumination, other static or adaptive means of illumination could also be provided, which could assume other illumination functions. The computing unit could also mark and continue to illuminate recognized objects, even if the vehicle driver has averted his gaze from these objects. Furthermore, the inventive illumination system allows simultaneous illumination of several objects.

To prevent blinding of oncoming road users, an advantageous embodiment of the inventive illumination system can provide that at least one camera is set up to detect the vehicle surroundings, the at least one computing unit being set up to evaluate the information obtained in this way and to recognize road users located in the vehicle surroundings, recognized road users being selected according to defined criteria and it being possible to suppress the targeted illumination of the selected road users.

It can be favorable for at least one camera to be set up to detect a curve in the road lying in front of the vehicle.

It can be especially advantageous if at least one camera is set up to detect the vehicle surroundings, the at least one computing unit being set up to evaluate the information obtained in this way and to recognize objects, in particular road signs, located in the vehicle surroundings, and it being possible to control the intensity of targeted illumination of a light-reflecting object on the basis of its reflectivity. The control of the intensity has already been discussed at the beginning.

It can be especially favorable if at least one camera is set up to detect the vehicle surroundings, the at least one computing unit being set up to evaluate the information obtained in this way and to recognize and check objects, especially moving objects, located in the vehicle surroundings, the computing unit being set up to compare the position of a respective object with the direction in which the vehicle driver is looking and, depending on the result of the checking of the object and the comparison with the direction in which the vehicle driver is looking, triggering the at least one adaptive means of illumination in a targeted manner.

A third aspect of the invention involves a motor vehicle having at least one inventive illumination system. It is preferable for the motor vehicle to have two front headlights equipped with the inventive illumination system.

The invention along with other embodiments and advantages is explained in detail below using a non-restrictive sample embodiment, which is illustrated in the figures. The figures are as follows:

FIG. 2 is a schematic representation of an inventive illumination process.

Figure 1:
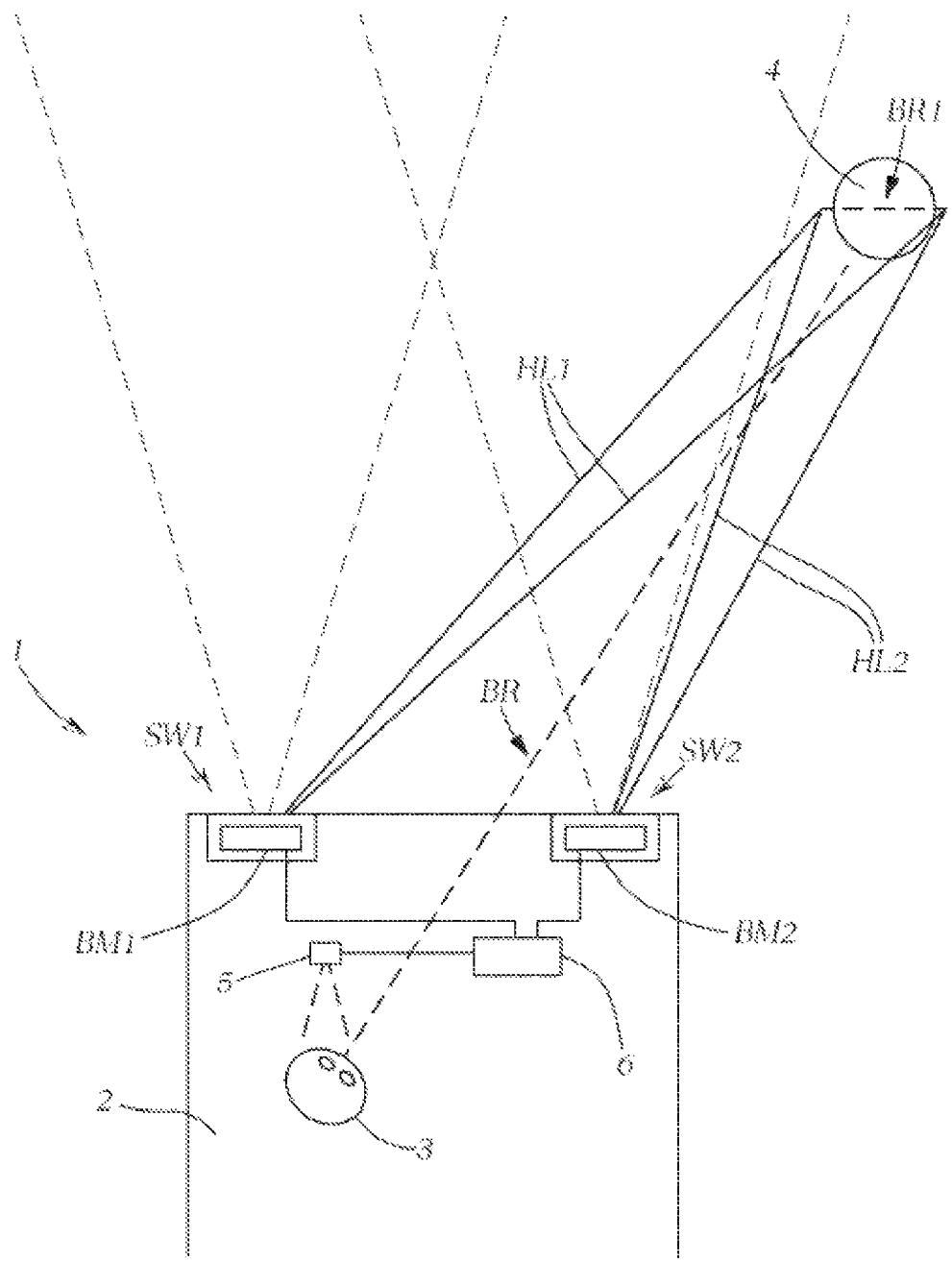
FIG. 1 is a schematic representation of an inventive illumination system.

FIG. 1 is a schematic representation of a first embodiment of an inventive illumination system 1. It contains a top view of a front section of a vehicle 2, preferably a motor vehicle, which is equipped with two vehicle headlights SW1 and SW2 that are designed to be front headlights. This vehicle 2 has a vehicle driver 3 inside it who is looking in the direction BR, which is shown by a dashed line extending from his head to an object 4 that he is viewing, which for example largely fills an area BR1 lying in the direction BR in which he is looking. The direction BR in which the vehicle driver 3 is looking is understood to be, in particular, the physiological straight-ahead direction. The direction BR in which the vehicle driver 3 is looking is detected through a camera 5 (or also multiple cameras), which preferably monitors an area of the face of the vehicle driver 3 and in particular detects the position of his eyes or their fixation. Cameras 5 and associated software and hardware components that are suitable for this purpose are sufficiently known from the prior art and are frequently associated with the expression "eye tracking". Head movements (which cannot generally be equated with the direction BR in which driver is looking) can be detected by the camera 5 and then evaluated (for example, to recognize symptoms of tiredness).

The camera 5 is connected with a computing unit 6, which receives information from the camera 5 about the direction in which the driver is looking, evaluates this information, and produces, on the basis of it, control signals that are transferred to adaptive means of illumination BM1 or BM2, which are arranged in the vehicle headlights SW1 or SW2. The adaptive means of illumination BM1 and BM2 are set up to evaluate the control signals and target individual areas in the light pattern of the adaptive means of illumination to be illuminated or masked, which can produce targeted illumination of the object 4. Therefore, means of illumination with a segmented light pattern are especially suitable as adaptive means of illumination BM1 and BM2. In the embodiment that is shown, a vehicle headlight SW1 or SW2 has exactly one adaptive means of illumination BM1 or BM2. In the example shown, the area BR1 lying in the direction BR in which the driver is looking is illuminated by both means of illumination BM1 and BM2. The horizontal component of a segment of the respective means of illumination BM1 and BM2 that is illuminated for this purpose is indicated by the auxiliary lines HL1 and HL2, which are defined by limitation of the spatial dimensions of the respective segment or the properties of the associated adaptive means of illumination, and indicate the horizontal limitation of the area BR1 lying in the direction BR in which the driver is looking. The vertical limitation of this area BR1 is done in an analogous manner by vertical segmentation.

FIG. 2 is a schematic representation of an inventive process that is used, for example, in the illumination system 1. The first step in this process is for camera 5 to detect the direction BR in which the vehicle driver 3 is looking. This information is passed to the at least one computing unit 6, which evaluates the information and, on the basis of it, produces control signals and transmits them to the adaptive means of illumination BM1 and BM2. The adaptive means of illumination BM1 and BM2 implement the control signals by targeted illumination of the area BR1 lying in the direction BR in which the vehicle driver 3 is looking. The targeted illumination of this area BR1 is generally performed in addition to other light functions that can be assumed by the adaptive means of illumination BM1 and BM2. For example, the adaptive means of illumination can be set up to produce a low-beam or high-beam pattern in the same way. Functions for automatic recognition and illumination of objects located in the vehicle surroundings and/or for targeted illumination or masking of other road users can also be implemented. This can involve providing a hierarchy. For example, the masking of oncoming road users can have priority over targeted illumination of the area BR1 lying in direction BR in which the vehicle driver 3 is looking, so that in the case in which the vehicle driver 3 looks in the direction of the oncoming road user, illumination of this area BR1 is suppressed. It is preferable for the vehicle surroundings to be detected by an additional camera, which can be connected, for example, with an additional computing unit to evaluate the information about the vehicle surroundings. The road users located in the vehicle surroundings can be recognized with the help of known image processing algorithms. The selection of road users can involve, for example, recognizing oncoming road users and masking them out. Criteria that can be used for this are, for example, movements of the recognized road users and/or the position of the road users (e.g., in a left area of the picture or the left half of the picture of the vehicle surroundings detected using a camera, relative to the direction of travel of the vehicle 2).

Of course the technical structure of the described illumination system 1 can be modified in any way that is obvious to the person skilled in the art. For example, the computing unit 6 can form an integral component of the camera 5. The computing unit 6 could also be associated with the headlight SW1 or SW2. Furthermore, it would be simple to modify or adapt the inventive process, for example by storing the time behavior of the direction BR in which the driver is looking and continuing to illuminate objects located in the direction BR in which the driver is looking, even after the direction BR in which the driver is looking turns away from the objects.

The invention claimed is:

1. A process for producing an adaptive light pattern that is produced by at least one vehicle headlight (SW1, SW2) in a vehicle (2) that is configured to be steered by a vehicle driver (3), the at least one vehicle headlight (SW1, SW2) having at least one adaptive means of illumination (BM1, BM2), the process comprising:
    detecting, with at least one camera (5), a direction (BR) in which the vehicle driver is looking;
    using at least one computing unit (6) to evaluate the detected direction and thereby produce control signals; and
    transmitting the control signals to the at least one vehicle headlight (SW1, SW2) with the at least one adaptive means of illumination (BM1, BM2) to produce the adaptive light pattern,
    wherein the at least one adaptive means of illumination (BM1, BM2) is controlled, on the basis of the control signals, for targeted illumination of an area (BR1) lying in the direction (BR) in which the vehicle driver (3) is looking,
    wherein the at least one adaptive means of illumination (BM1, BM2) is configured to execute different light functions comprising a low-beam function, a glare-free high-beam function, and an adaptive light pattern function, the light functions being organized in a hierarchy, in which a production of a low-beam pattern comprises the highest priority followed by a production of a high-beam pattern and the targeted illumination of the area lying in the direction (BR) in which the vehicle driver (3) is looking, and
    wherein surroundings of the vehicle are detected by the at least one camera (5), and wherein the at least one computing unit (6) evaluated information obtained from the at least one camera (5), recognizes light-reflecting objects comprising road signs located in the vehicle surroundings, and controls an intensity of targeted illumination of one of the light-reflecting objects on the basis of its reflectivity.

2. The process of claim 1, wherein the adaptive light pattern is produced by horizontal and/or vertical segmentation of a light pattern of the at least one adaptive means of illumination (BM1, BM2).

3. The process of claim 1, wherein the adaptive light pattern is put together from light patterns of two vehicle headlights (SW1, SW2), each of which includes the at least one adaptive means of illumination (BM1, BM2).

4. The process of claim 1, wherein the adaptive light pattern is put together from light patterns of two vehicle headlights (SW1, SW2), each of which has exactly one of the at least one adaptive means of illumination (BM1, BM2).

5. The process of claim 1, wherein the adaptive light pattern is produced by at least two adaptive means of illumination (BM1, BM2) that are controlled independently of one another.

6. The process of claim 1, wherein the vehicle surroundings are detected by the at least one camera (5), and the at least one computing unit (6) evaluates information obtained by the at least one camera and recognizes road users located in the vehicle surroundings and selects them according to defined criteria, at least the targeted illumination of the selected road users being suppressed.

7. The process of claim 1, wherein the at least one camera (5) detects a curve in a road lying in front of the vehicle (2).

8. The process of claim 1, wherein the vehicle surroundings are detected by the at least one camera (5), and wherein the at least one computing unit (6) evaluates information obtained by the at least one camera (5) and checks moving objects located in the vehicle surroundings for their relevance to traffic on the basis of defined criteria, the position of a respective object being compared with the direction in which the vehicle driver (3) is looking and, depending on a result of the checking of the object and the comparison with the direction in which the vehicle driver is looking, taking at least one illuminating engineering measure to direct the attention of the vehicle driver.

9. An illumination system (1) for producing an adaptive light pattern that is produced by at least one vehicle headlight (SW1, SW2) in a vehicle (2) that is configured to be steered by a vehicle driver (3), the at least one vehicle headlight (SW1, SW2) having at least one adaptive means of illumination (BM1, BM2), the illumination system comprising:
    at least one camera (5) configured to detect a direction (BR) in which the vehicle driver is looking; and
    at least one computing unit (6) configured to control the at least one adaptive means of illumination for targeted illumination of an area (BR1) lying in the direction (BR) in which the vehicle driver (3) is looking,
    wherein the at least one adaptive means of illumination (BM1, BM2) is configured to execute different light functions comprising a low-beam function, a glare-free high-beam function, and an adaptive light pattern function, the light functions being organized in a hierarchy, in which a production of a low-beam pattern comprises the highest priority followed by a production of a high-beam pattern and the targeted illumination of the area lying in the direction (BR) in which the vehicle driver (3) is looking, and wherein at least one camera (5) is configured to detect vehicle surroundings, and wherein the at least one computing unit (6) is configured to evaluate information obtained by the at least one camera, recognize objects comprising road signs located in the vehicle surroundings, and to control an intensity of targeted illumination of a light-reflecting object on the basis of its reflectivity.

10. The illumination system of claim 9, wherein the at least one adaptive means of illumination (BM1, BM2) have horizontal and/or vertical segmentation.

11. The illumination system of claim 9, wherein the at least one vehicle headlight (SW1, SW2) has exactly one of the at least one adaptive means of illumination (BM1, BM2).

12. The illumination system of claim 9, wherein the at least one camera (5) is configured to detect the vehicle surroundings, the at least one computing unit (6) being configured to evaluate information obtained by the at least one camera and to recognize road users located in the vehicle surroundings, recognized road users being selected according to defined criteria and the targeted illumination of the selected road users being suppressible.

13. The illumination system of claim 12, wherein the at least one camera (5) is configured to detect a curve in a road lying in front of the vehicle (2).

14. The illumination system of claim 9, wherein the at least one camera (5) is configured to detect the vehicle surroundings, wherein the at least one computing unit (6) is configured to evaluate information obtained from the at least one camera, recognize and check moving objects located in the vehicle surroundings, compare a position of a respective object with the direction in which the vehicle driver (3) is looking, and, depending on a result of the checking of the object and the comparison with the direction in which the vehicle driver is looking, trigger the at least one adaptive means of illumination (BM1, BM2) in a targeted manner.

15. A motor vehicle comprising at least one illumination system of claim 9.

16. The motor vehicle of claim 15, wherein the motor vehicle has two front headlights equipped with the illumination system.

17. A process for producing an adaptive light pattern that is produced by a vehicle headlight (SW1, SW2) in a vehicle (2) that is configured to be steered by a vehicle driver (3), the vehicle headlight (SW1, SW2) having an adaptive means of illumination (BM1, BM2), the process comprising:

detecting, with a camera (5), a direction (BR) in which the vehicle driver is looking;

using a computing unit (6) to evaluate the detected direction and thereby produce control signals; and transmitting the control signals to the vehicle headlight (SW1, SW2) with the adaptive means of illumination (BM1, BM2), wherein the adaptive means of illumination (BM1, BM2) is controlled, on the basis of the control signals, for targeted illumination of an area (BR1) lying in the direction (BR) in which the vehicle driver (3) is looking, wherein the adaptive means of illumination (BM1, BM2) is configured to execute different light functions comprising a low-beam function, a glare-free high-beam function, and an adaptive light pattern function, the light functions being organized in a hierarchy, in which a production of a low-beam pattern comprises the highest priority followed by a production of a high-beam pattern and the targeted illumination of the area lying in the direction (BR) in which the vehicle driver (3) is looking, and wherein vehicle surroundings are detected by the camera (5), and the computing unit (6) evaluates the information obtained by the camera (5), checks moving objects located in the vehicle surroundings for their relevance to traffic on the basis of defined criteria, a position of a respective object being compared with the direction in which the vehicle driver (3) is looking, and, depending on a result of the checking of the object and the comparison with the direction in which the vehicle driver is looking, takes a illuminating engineering measure to direct the attention of the vehicle driver.

18. An illumination system (1) for producing an adaptive light pattern that is produced by a vehicle headlight (SW1, SW2) in a vehicle (2) that is configured to be steered by a vehicle driver (3), the vehicle headlight (SW1, SW2) having an adaptive means of illumination (BM1, BM2), the illumination system comprising:

a camera (5) configured to detect a direction (BR) in which the vehicle driver is looking; and a computing unit (6) configured to control the adaptive means of illumination for targeted illumination of an area (BR1) lying in the direction (BR) in which the vehicle driver (3) is looking, wherein the adaptive means of illumination (BM1, BM2) is configured to execute different light functions comprising a low-beam function, a glare-free high-beam function, and an adaptive light pattern function, the light functions being organized in a hierarchy, in which a production of a low-beam pattern comprises the highest priority followed by a production of a high-beam pattern and the targeted illumination of the area lying in the direction (BR) in which the vehicle driver (3) is looking, and wherein the camera (5) is configured to detect vehicle surroundings, the computing unit (6) being configured to evaluate information obtained by the camera, recognize and check moving objects located in the vehicle surroundings, compare a position of a respective object with the direction in which the vehicle driver (3) is looking, and, depending on a result of the checking of the object and the comparison with the direction in which the vehicle driver is looking, trigger the at least one adaptive means of illumination (BM1, BM2) in a targeted manner.

* * * * *